US011394951B2

(12) United States Patent
Lee et al.

(10) Patent No.: US 11,394,951 B2
(45) Date of Patent: Jul. 19, 2022

(54) IMAGE SENSOR MODULE

(71) Applicant: HANWHA TECHWIN CO., LTD., Seongnam-si (KR)

(72) Inventors: Jong Hyeok Lee, Seongnam-si (KR); Jong Kyung Lee, Seongnam-si (KR); Do Won Ko, Seongnam-si (KR); Yong Jun Lee, Seongnam-si (KR); Joong Gyun Jeong, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 231 days.

(21) Appl. No.: 16/746,249

(22) Filed: Jan. 17, 2020

(65) Prior Publication Data
US 2020/0236340 A1 Jul. 23, 2020

(30) Foreign Application Priority Data

Jan. 23, 2019 (KR) ........................ 10-2019-0008538

(51) Int. Cl.
H04N 13/246 (2018.01)
H04N 13/243 (2018.01)
(52) U.S. Cl.
CPC ......... H04N 13/246 (2018.05); H04N 13/243 (2018.05)
(58) Field of Classification Search
CPC .. H04N 13/246; H04N 13/243; H04N 17/002; H04N 5/2251; H04N 5/2258; H04N 5/23238; G06T 7/85
See application file for complete search history.

(56) References Cited

U.S. PATENT DOCUMENTS

| 10,999,528 | B2* | 5/2021 | Cotoros | ............ H04N 5/23216 |
| 2005/0243191 | A1* | 11/2005 | Itoh | ..................... H04N 1/00541 348/231.99 |
| 2006/0077543 | A1* | 4/2006 | Miyoshi | ............... H04N 13/133 359/407 |
| 2008/0055409 | A1* | 3/2008 | Mars | .................. G08B 13/1963 348/143 |
| 2014/0218535 | A1* | 8/2014 | Ihlenburg | ................. H04N 7/10 348/148 |

(Continued)

FOREIGN PATENT DOCUMENTS

| CN | 104243784 A | 12/2014 |
| CN | 104378556 A | 2/2015 |

(Continued)

OTHER PUBLICATIONS

Communication dated Jul. 26, 2021, issued by the State Intellectual Property Office of P.R. China in counterpart Chinese Application No. 202010046467.5.

(Continued)

Primary Examiner — Maria E Vazquez Colon
(74) Attorney, Agent, or Firm — Sughrue Mion, PLLC

(57) ABSTRACT

Provided are an image sensor module, an image processing module, and an imaging device including the two modules. The image sensor module includes: a plurality of image sensors: a frame in which the image sensors are mounted to have different imaging angles; and at least one memory configured to store calibration information reflecting distance information generated from images obtained by the image sensors, respectively.

15 Claims, 11 Drawing Sheets

(56) References Cited

U.S. PATENT DOCUMENTS

| | | | | |
|---|---|---|---|---|
| 2017/0352191 A1* | 12/2017 | Zhou | .................... | H04N 21/854 |
| 2019/0087946 A1* | 3/2019 | Chiba | ...................... | H04N 5/74 |
| 2019/0297283 A1* | 9/2019 | Douady | ................... | G06T 7/00 |

FOREIGN PATENT DOCUMENTS

| | | | | | |
|---|---|---|---|---|---|
| CN | 106813659 | A | | 6/2017 | |
| CN | 206226569 | U | | 6/2017 | |
| JP | 2001-119625 | A | | 4/2001 | |
| KR | 10-2005-0090773 | A | | 9/2005 | |
| KR | 10-0592135 | B1 | | 8/2006 | |
| KR | 10-2011-0097512 | A | | 8/2011 | |
| WO | WO-2017022452 | A1 | * | 2/2017 | .............. B60Q 9/00 |
| WO | 2017/169186 | A1 | | 10/2017 | |

OTHER PUBLICATIONS

Communication dated Apr. 15, 2022 by the Chinese Patent Office in Chinese Patent Application No. 202010046467.5.

* cited by examiner

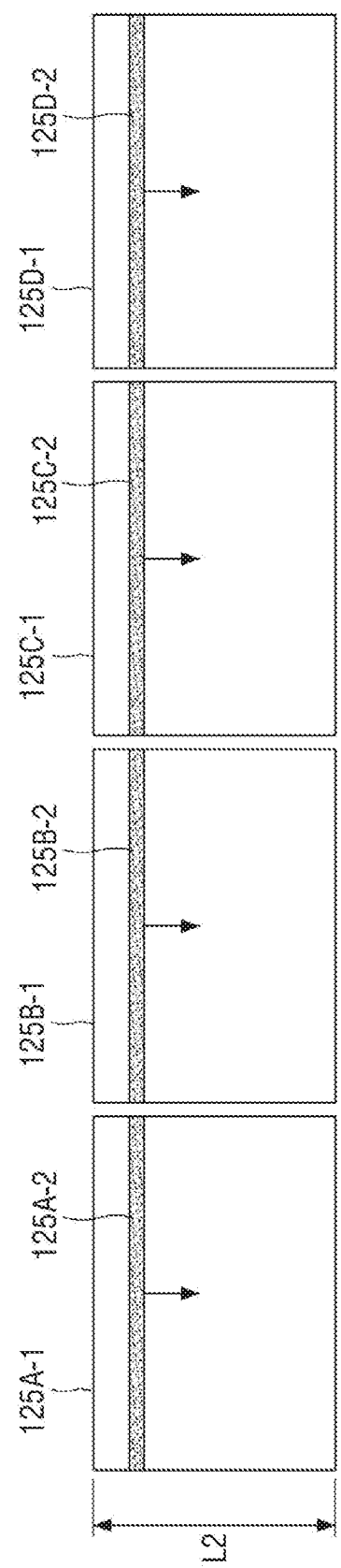
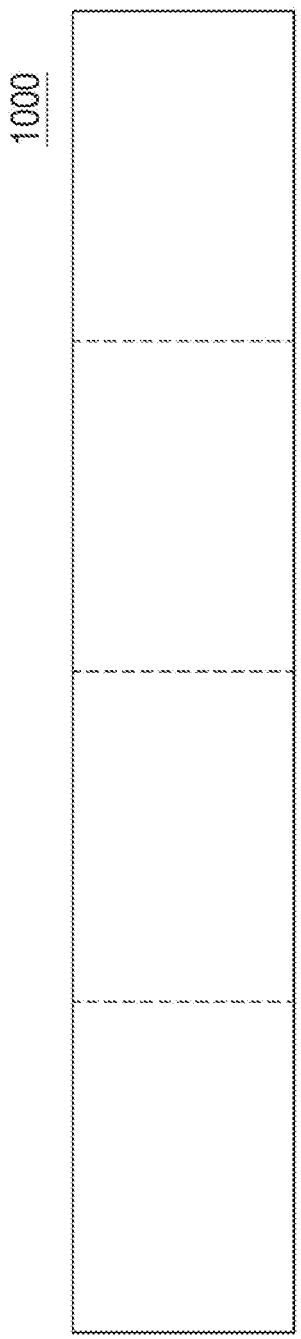

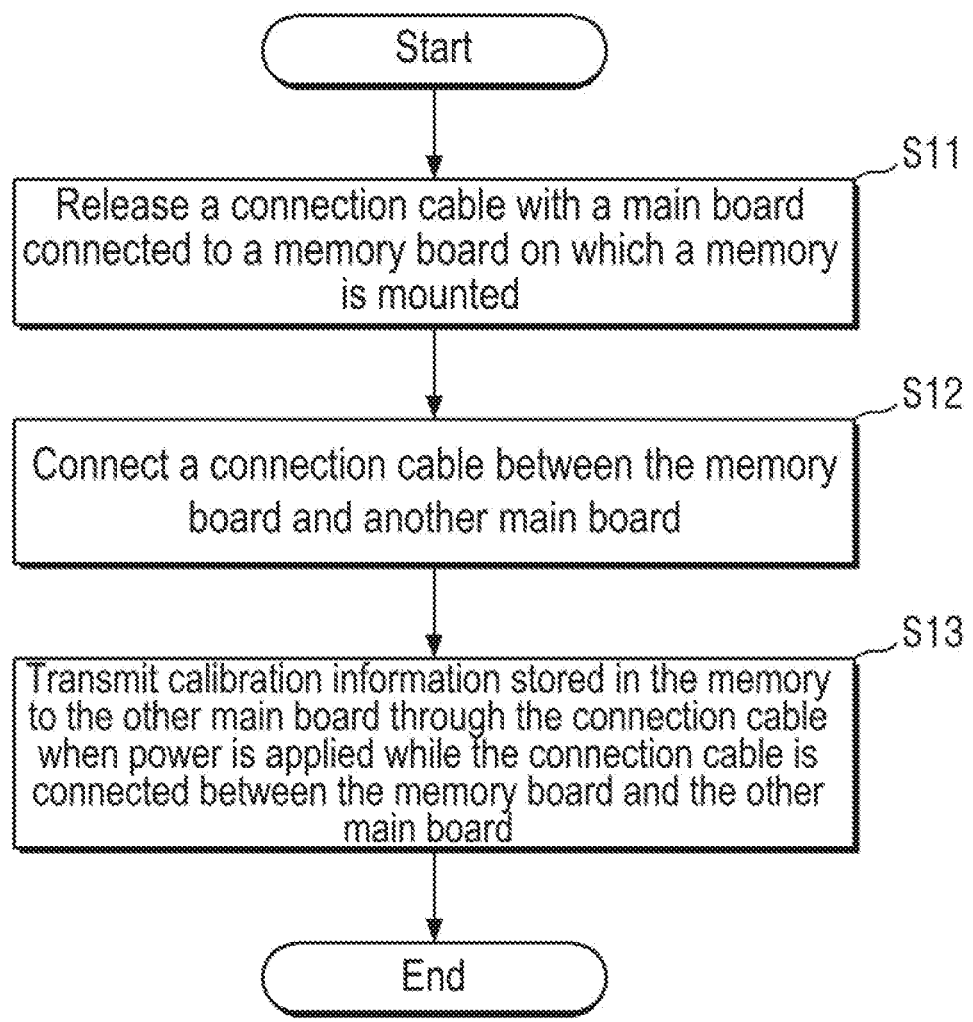

IMAGE SENSOR MODULE

CROSS-REFERENCE TO THE RELATED APPLICATION

This application is based on and claims priority from Korean Patent Application No. 10-2019-0008538 filed on Jan. 23, 2019 in the Korean Intellectual Property Office, the disclosure of which is incorporated herein in its entirety by reference.

BACKGROUND

1. Field

Apparatus and methods consistent with exemplary embodiments of the inventive concept relate to an image sensor module, and more particularly to an image sensor module having a plurality of image sensors for generating a three-dimensional image from a plurality of images obtained by the image sensors.

2. Description of the Related Art

In order for a multi-sensor camera with a plurality of image sensors to obtain a plurality of respective images and combine (or fuse) the images, information for combining the images is required.

When a failure occurs in combing the images after installing the multi-sensor camera, a user may either replace a defective part with a new part, set an overlap region by himself/herself (user calibration), or replace the camera with a new camera. In this case, an image obtained by combining the images obtained by the camera with the new part or the new multi-sensor camera may be distorted because unique information about each sensor may change. In particular, when a failure occurs in a main board processing the images and the camera is replaced with the new camera, a problem may occur that the unique information about the image sensors may not be known to a processor included in a main board of a new camera because the unique information is stored in the main board of the replaced camera.

SUMMARY

Various exemplary embodiments of the inventive concept provide an image sensor module that may easily address a failure of a multi-sensor camera. The embodiments also provide a memory board that may easily address a failure of the multi-sensor camera. The embodiments further provide a method that may easily address a failure of the multi-sensor camera.

According to the embodiments, there is provided an image sensor module which may include: a plurality of image sensors: a frame in which the image sensors are mounted to have different imaging angles; and at least one memory configured to store calibration information reflecting distance information generated from images obtained by the image sensors, respectively.

The calibration information may include information about an overlapping region of the images obtained by the image sensors and the distance information. The calibration information may further include information about characteristics of each of the image sensors. The calibration information may be used for generating a three-dimensional image by combining the images.

The image sensor module may further include a transmitter configured to transmit the calibration information stored in the memory to a main board of an image processing module which generates an image by combining the images based on the calibration information.

In addition, the transmitter may transmit the calibration information stored in the memory to the main board of the image processing module when the main board of the image processing module is connected with the memory, or transmit the calibration information stored in the memory to the main board when power is applied to the image sensor module, or transmit the calibration information stored in the memory to another main board when the main board of the image processing module is replaced with the other main board.

The memory of the image sensor module may be a flash memory.

Each of the image sensors may be rotatable at a predetermined angle while maintaining an optical axis, and the calibration information may include calibration information when each of the image sensors is at a first angle and calibration information when each of the image sensors is at a second angle orthogonal to the first angle.

According to embodiments, there is provided an imaging device which may include: the above image sensor module; and an image processing module including another memory and a processor configured to generate an image by combining the images obtained by the image sensors based on the calibration information.

The image generated by the image processing module may be a three-dimensional image.

The image sensor module may be configured to transmit the calibration information stored in the memory of the image sensor module to the other memory of the image processing module, in response to the processor of the image processing module comparing data stored in the memory of the image sensor module with data stored in the other memory of the image processing module, and detecting a difference therebetween.

According to embodiments, there is provided a memory board mounted on an image sensor module including one or more memories and a plurality of image sensors. The memory board may include a memory to store calibration information reflecting distance information about a plurality of images respectively obtained by the image sensors having different imaging angles.

The memory board may include a transmitter configured to transmit the calibration information stored in the memory to a main board of an image processing module so that the image processing module generates a three-dimensional image by combining the images obtained by the image sensors based on the calibration information.

According to embodiments, there is provided a method for transmitting calibration information stored in a memory mounted on an image sensor module to a main board of an image processing module. The method may include: releasing a connection cable connecting the main board with a memory board including the memory; connecting the connection cable or another connection cable between the memory board and another main board replacing the main board of the image processing module; and transmitting the calibration information stored in the memory to the other main board through the connection cable in response to power being applied while the connection cable is connected between the memory board and the other main board.

The calibration information comprises information about characteristics of each of the image sensors.

The embodiments have at least the following effects.

When the main board of the image processing module is in failure and the main board is replaced by another main board, information about the image sensor module may be easily applied to the other board, which is effective in responding to the failure.

BRIEF DESCRIPTION OF THE DRAWINGS

The above and other aspects of the inventive concept will become more apparent by describing in detail exemplary embodiments thereof with reference to the attached drawings, in which:

FIGS. 9A, 9B, 10A and 10B are views for describing a process of generating one image from a plurality images obtained by a plurality image sensors, respectively, according to embodiments; and FIG. 11 is a flowchart of a method for transmitting calibration information stored in a memory mounted on an image sensor module to a main board of an image processing module, according to an embodiment.

DETAILED DESCRIPTION OF THE EMBODIMENTS

Figure 1:
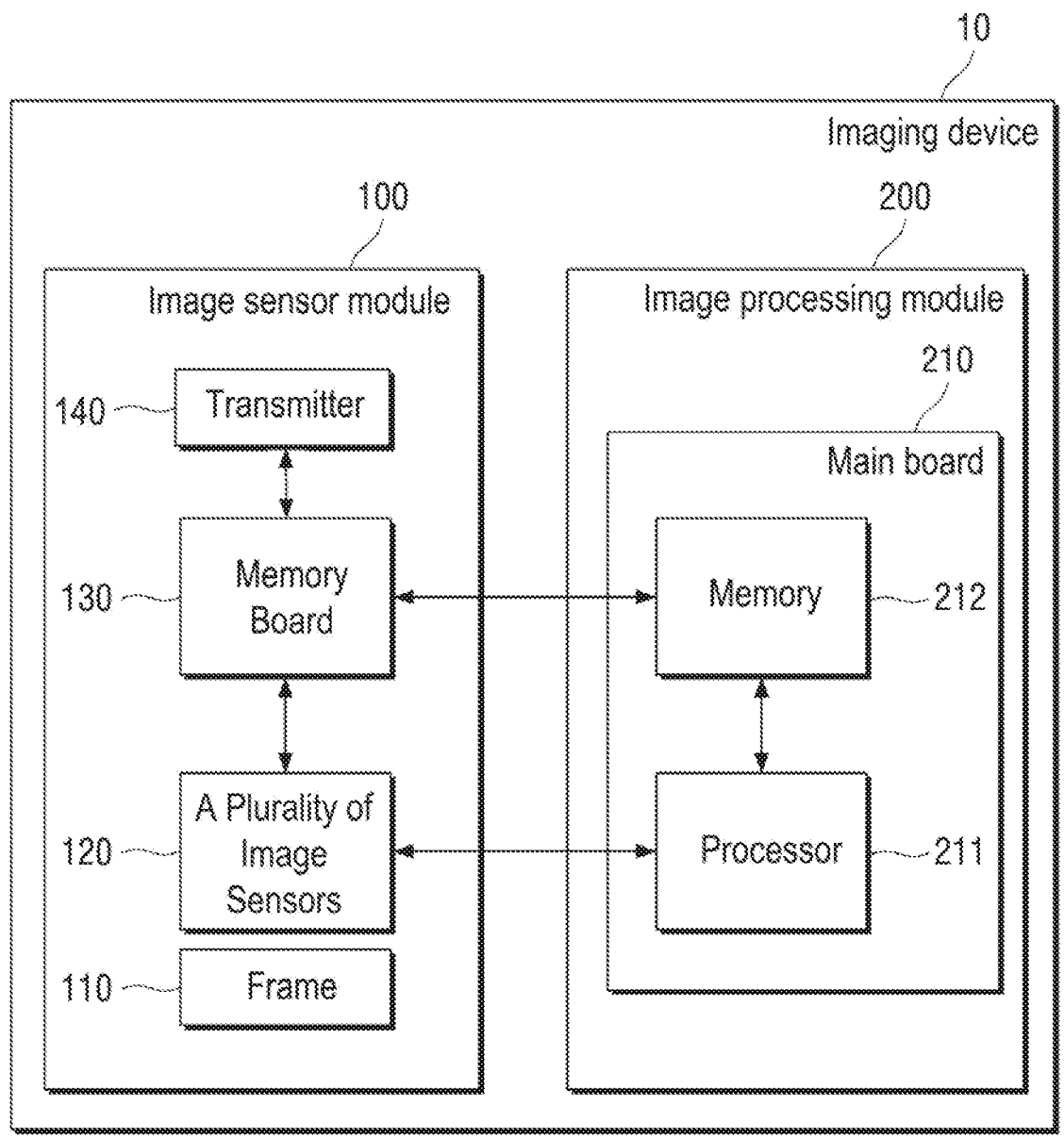
FIG. 1 is a block diagram of an image sensor module of an imaging device according to an embodiment.

Various aspects of the inventive concept, and methods for achieving the same will become apparent with reference to embodiments described below in detail in conjunction with the accompanying drawings. The embodiments of the inventive concept described herein are all exemplary. However, the inventive concept is not limited thereto, but may be implemented in various different forms. These embodiments are merely provided to make the present disclosure complete and to fully inform the scope of the inventive concept to those skilled in the art. The inventive concept is defined by the scope of claims. Like reference numerals refer to like elements throughout the specification.

Unless otherwise defined, all terms (including technical and scientific terms) used herein may be used in a sense that may be commonly understood by those of ordinary skill in the art. In addition, the terms defined in the commonly used dictionaries are not ideally or excessively interpreted unless they are specifically defined clearly.

The terms used herein are for the purpose of describing embodiments and are not intended to be limiting of the inventive concept. Herein, the singular also includes the plural unless specifically stated otherwise in the phrase. The term "comprises" and/or "comprising" as used herein does not exclude the presence or addition of one or more other components in addition to the mentioned components.

Figure 2:
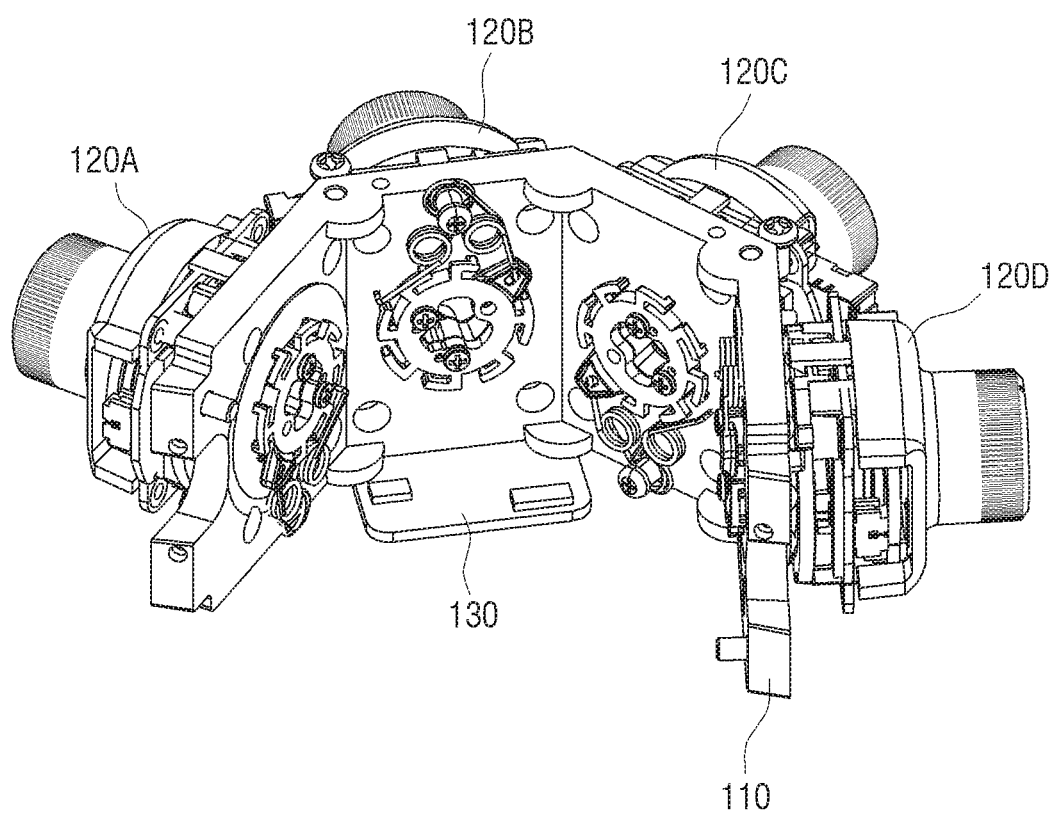
FIG. 2 is a perspective view of an image sensor module of an imaging device according to an embodiment.
Figure 3:
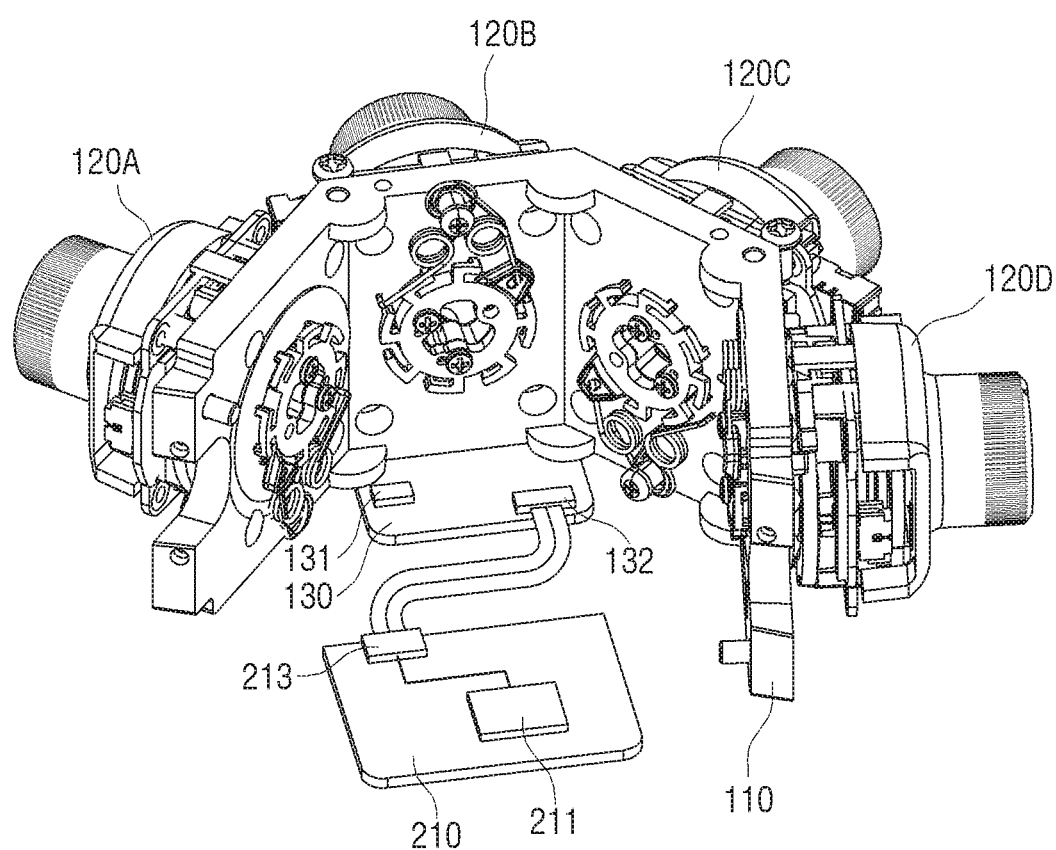
FIG. 3 illustrates a state in which a memory board of an image sensor module and a main board of the image processing module are connected through a connection cable, according to an embodiment.

FIG. 1 is a block diagram of an image sensor module of an imaging device according to an embodiment. FIG. 2 is a perspective view of the image sensor module, according to an embodiment. FIG. 3 illustrates a state in which a memory board of an image sensor module and a main board of an image processing module are connected through a connection cable, according to an embodiment.

An image sensor module 100 of an imaging device 10 according to an embodiment may include a plurality of image sensors 120, a frame 110, and a memory board 130, and may further include a transmitter 140. According to another embodiment, the transmitter 140 may be included in the memory board 130. The image sensor module 100 may configure the imaging device 10 together with an image processing module 200 which includes a main board 210. According to an embodiment, the main board 210 may include a processor 211 and a memory 212.

The image sensors 120 are mounted on the frame 110 such that each image sensor has a different imaging angle.

More specifically, each of the image sensors 120 is mounted on the frame 110 to have a different imaging angle in order to image (or capture) a plurality of images necessary to generate one image. As shown in FIG. 2, the sensors 120 includes image sensors 120A, 120B, 120C and 120D mounted on the frame 110, in which mounting bodies for each of the image sensors 120 are formed to have different imaging angles. In order to generate one image by using images obtained by each of the image sensors 120, the image sensors 120 are mounted to have respective imaging angles such that a portion of an image obtained by an image sensor overlaps a portion of an image obtained by a neighboring image sensor.

Each image sensor may include a lens, a sensor, and other components. The lens may include an optical component that appropriately adjusts light so that the sensor may obtain an image. The sensor may be mounted on a circuit board. Here, a center point of the sensor be positioned on an optical axis. The sensor may be a charge-coupled device (CCD) image sensor, a complementary metal-oxide semiconductor (CMOS) image sensor, or the like.

The memory board 130 includes at least one memory 131 (FIG. 3) which stores calibration information reflecting distance information generated from an image obtained by each of the image sensors 120. Here, the calibration information may be stored as a look up table (LUT). The distance information is one of information used for a sensor fusion in a multi-sensor camera environment, and may refer to a distance between each of the image sensors 120 and a subject to be captured. It might be necessary to obtain calibration information for the sensor fusion because image distortions could occur and overlap values could vary according to lens specifications from various image sensors and the distance information.

More specifically, the memory 131 may store calibration information necessary to correct images obtained by the image sensors 120 as a look up table. The memory board 130 may be mounted on the frame 110. The memory board 130 may be formed as one component of the frame 110 and may be combined in a form that may be separated from the frame 110 to increase mobility. The memory 131 may be a flash memory. It may be a non-volatile memory such as NAND flash or electrically erasable programmable read-only memory (EEPROM), or may be a magnetic storage memory, but the type of a storage medium is not limited thereto.

Referring to FIG. 3, when a connection cable is connected between the memory board 130 and a connector 213 of the main board 210 through a connector 132 and power is applied to the memory board 130, calibration information stored in the memory 131 of the memory board 130 is transmitted to the memory 212 of the main board 210 through the connection cable, or image processing is performed using information in the processor 211 of the main board 210.

When the main board or its components are replaced due to a failure of the main board 210 or a failure of the image sensor module 100, the calibration information must be shared between the image sensor module 100 and the image processing module 200. To this end, when a failure occurs in the main board 210, first, connection through the connection cable between the main board 210 and the memory board 130 is released. Thereafter, the connection cable or a new connection cable is connected between the memory board 130 and another main board replacing the failed main board 210. Here, the other main board may be a new main board. When power is applied while the connection cable is connected between the memory board 130 and the other main board, the calibration information stored in the memory 131 is transmitted to the other main board through the connection cable. Therefore, even if the main board 210 fails, it is possible to address the failure by replacing only the main board 210 without replacing the image sensor module 100 or its components.

When connected through the connection cable, I2C communication is connected between the memory 131 of the memory board 130 and the processor 211 of the main board 210, and the look up table including the calibration information of the memory 131 is transmitted from the memory 131 and received at the processor 211. The I2C communication is activated (on) only when the connection cable is connected, and when the connection cable is disconnected, the I2C communication is deactivated (off). When power is applied to the imaging device 10, P-cal data stored in the memory 212, such as a NAND flash memory, of the main board 210 may be checked by the processor 211, and when the P-cal data of the memory 212 is different from P-cal data of the memory 131 of the memory board 30, the processor 211 may request the transmitter 140 to transmit the look up table including the calibration information stored in the memory 131 to the processor 211 of the main board 210.

Figure 4:
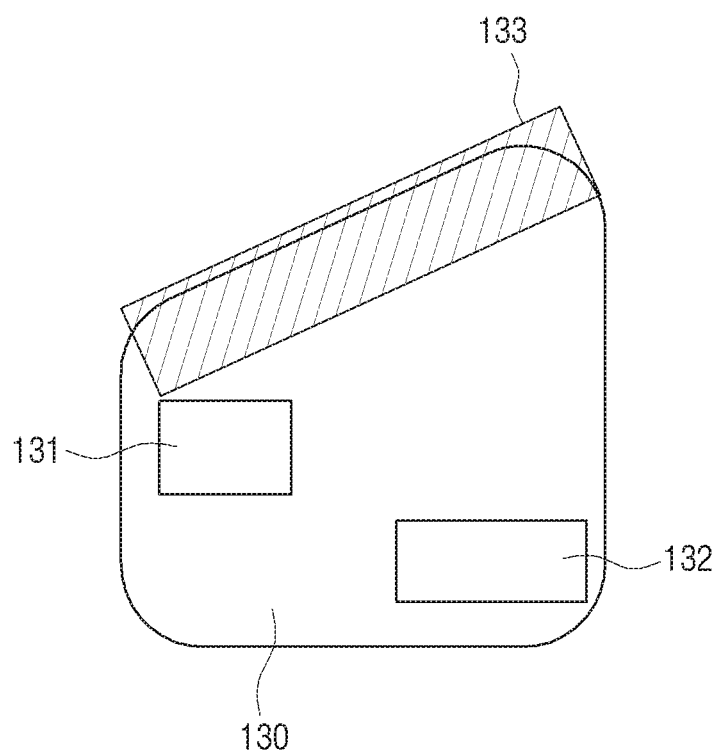
FIG. 4 illustrates a memory board of an image sensor module according to an embodiment.
Figure 5:
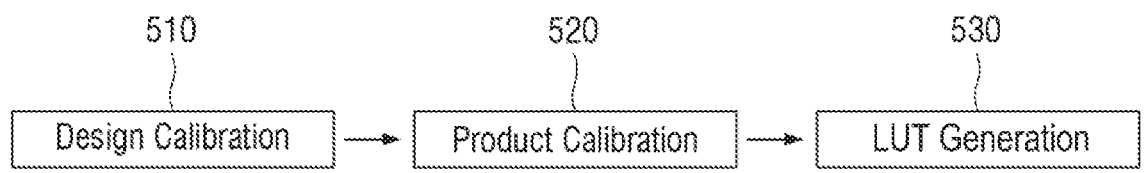
FIGS. 5 and 6A-6B are views for describing a process of generating calibration information stored in a memory of an image sensor module, according to an embodiment.

FIG. 4 illustrates a memory board of an image sensor module according to an embodiment, and FIGS. 5 and 6 are views for describing a process of generating calibration information stored in a memory of an image sensor module, according to an embodiment.

Referring to FIG. 4, the memory board 130 includes the memory 131 and the connector 132, and further include a mount 133 mounted on the image sensor module 100. Here, the mount 133 may have a screw hole or the like to be mounted on the image sensor module 100. The memory board 130 may be connected to any one of the image sensors 120 constituting the image sensor module 100. The memory board 130 may be formed to be replaceable separately from the image sensor module 100 and the image processing module 200.

In order to obtain a three-dimensional image by combining a plurality of images, it is necessary to know information about overlapping regions of the images. The information is calibration information that is derived during a combining process for each of the image sensors 120 The calibration information is different for each of the image sensors according to unique characteristics of each of the image sensors 120. When an image of an image sensor, e.g., an image sensor 120A of FIG. 3, is combined using calibration information about another image sensor, e.g., an image sensor 120B of FIG. 3, distortion may occur in a combined image, and thus, one clear image may not be generated. Therefore, calibration information according to unique characteristics of each of the image sensors 120 is stored, and images obtained by the image sensors 120 are combined using the stored calibration information to generate a combined image.

When calibration is performed to generate an image by combining a plurality of images and the combined image is a two-dimensional image, a user may directly perform calibration through a user calibration mode. However, it is difficult for the user to directly perform calibration to obtain a three-dimensional image by combining a plurality images because the user has to consider distance information of each of the image sensors 120. Therefore, it is necessary to provide calibration information capable of performing the calibration. Accordingly, calibration information for combining the images is generated as a look up table (LUT) and stored in the memory 131. The look up table includes calibration information about overlapping regions of the images obtained by the image sensors 120 for combining the images.

A process of generating calibration information for combining a plurality images and generating a look up table for storing the calibration information may be performed as shown in FIG. 5.

First, design calibration 510 of the image sensor module 100 is performed. The design calibration is a process to generate calibration information necessary for combining a plurality to obtain a three-dimensional image through the image sensor module 100 according to a specification of each of the image sensors 120 included in the image sensor module 100.

After performing the design calibration, product calibration 520 is performed. While the design calibration is a process to generate calibration information according to the specifications of the image sensors 120, the product calibration is a process to generate calibration information according to characteristics of each image. Even with the same specifications, there may exist a difference in characteristics for a plurality images respectively obtained by the image sensors 120. Therefore, product calibration that reflects the characteristics of the images is performed, and calibration information suitable for each image is generated.

Figure 6A:
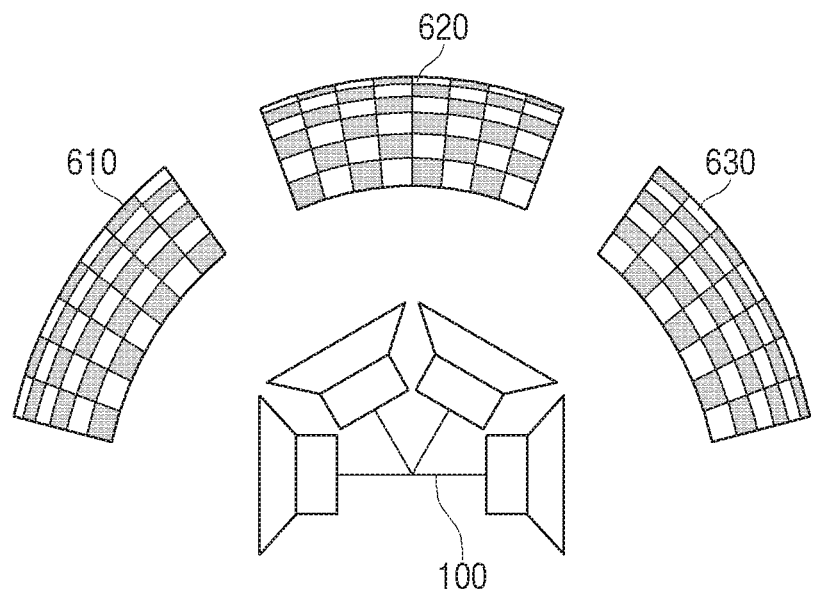
Figure 6B:
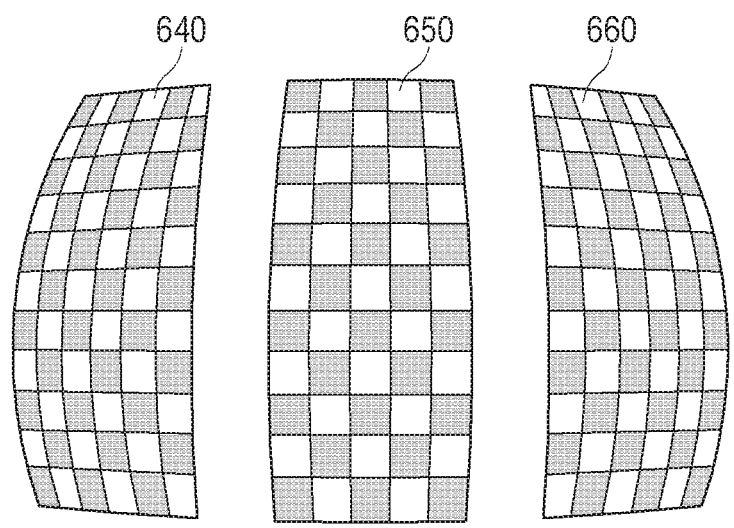

As shown in FIGS. 6A and 6B, a plurality plates 610 to 630 for calibration are positioned at a predetermined distance from the image sensor module 100, and image correction values depending on the distance for generating a combined image from a plurality images 640 to 660 obtained by the image sensor module 100 are calculated. Calibration information including the calculated correction values is generated.

By performing the design calibration and the product calibration, it is possible to prevent duplicate calibration information common to a plurality images. Naturally, the calibration may be performed for each image without performing the design calibration.

In this way, calibration generated for image overlap is generated as a look up table and stored in the memory 131.

A plurality images obtained by the image sensors 120 are sent to the image processing module 200 and combined into one image. Calibration information reflecting characteristics of each of the image sensors 120 is stored in the memory board 130 of the image sensor module 100. Therefore, the transmitter 140 of the image sensor module 100 transmits a look up table stored in the memory board 130 of the image sensor module 100 to the main board 210 of the image processing module 200. Here, the memory board 130 may be separately replaceable from the image sensor module 100 and the image processing module 200, according to an embodiment.

The image processing module 200 receives the look up table for calibration from the memory board 130 of the image sensor module 100, and stores it in the memory 212 at the beginning of coupling with the image sensor module 100. Then, when a plurality images obtained by the image sensors 120 are received from the image sensor module 100, the image processing module 200 generates one image by overlapping images using the look up table received and stored in the memory 212 in advance.

When the main board 210 of the image processing module 200 is replaced by another main board, the transmitter 140 transmits the look up table stored in the memory board 130 to the other main board. When the main board 210 of the image processing module 200 instead of the image sensor module 100 has a defect and is replaced by the other board, it is not possible to move the look up table stored in the main board 210 to the other main board, and thus, the calibration information will be lost.

It is known that an imaging device including an image sensor module and an image processing module has a considerably high defect rate of about 40% at a main board (network board) of the image processing module. Further, when calibration information is stored only on the main board, the entire imaging device may have to be replaced in the event of a failure at the main board. Therefore, it is very inefficient in terms of cost.

On the other hand, when the look up table for calibration is stored on the memory 130 of the image sensor module 100, it is not necessary to replace the entire imaging device 10 even if a failure occurs at the main board 210. In other words, when the main board 210 of the image processing module 200 is replaced by another main board, the transmitter 140 transmits the look up table stored in the memory 131 to the other main board, and the other main board receives the look up table from the transmitter 140 and stores the look up table in a memory of the other main board for combining a plurality images obtained by the image sensor module 100.

Even if the transmitter 140 is connected to the main board 210 instead of the other main board, it may transmit the calibration information stored in the memory board 30 to the other main board. When power is applied to the image sensor module 100, the transmitter 140 may transmit the calibration information stored in the memory 131 to the other main board. It may regard the applied power as a trigger and transmit the calibration information to the other main board.

When a failure occurs only in the image processing module 200 in the imaging device 10, the failure may be quickly and simply addressed by newly transferring the look up table stored in the memory 131 of the image sensor module 100 to the image processing module 200 without replacing the image sensor module 100 or generating new calibration.

In addition to the main board 210, even when a failure occurs in one or more of the image sensors 120 included in the image sensor module 100, the process as described above may be performed. When at least one of the image sensors 120 fails, the failed image sensor may be replaced with a new image sensor. When power is applied after the failed image sensor is replaced, the calibration information stored in the memory 131 may be transmitted to the main board 210. Here, when calibration information changes due to the replacement of the failed image sensor, the changed calibration information may be received by the memory 131 and transmitted to the main board 210 through the connection cable using various communication methods.

Each of the image sensors 120 of the image sensor module 100 according to the present embodiment may be configured to be rotatable at a predetermined angle while maintaining an optical axis. Here, the look up table may include calibration information when each of the image sensors 120 is at a first angle and calibration information when each of the image sensors 120 is at a second angle orthogonal to the first angle.

Figure 7:
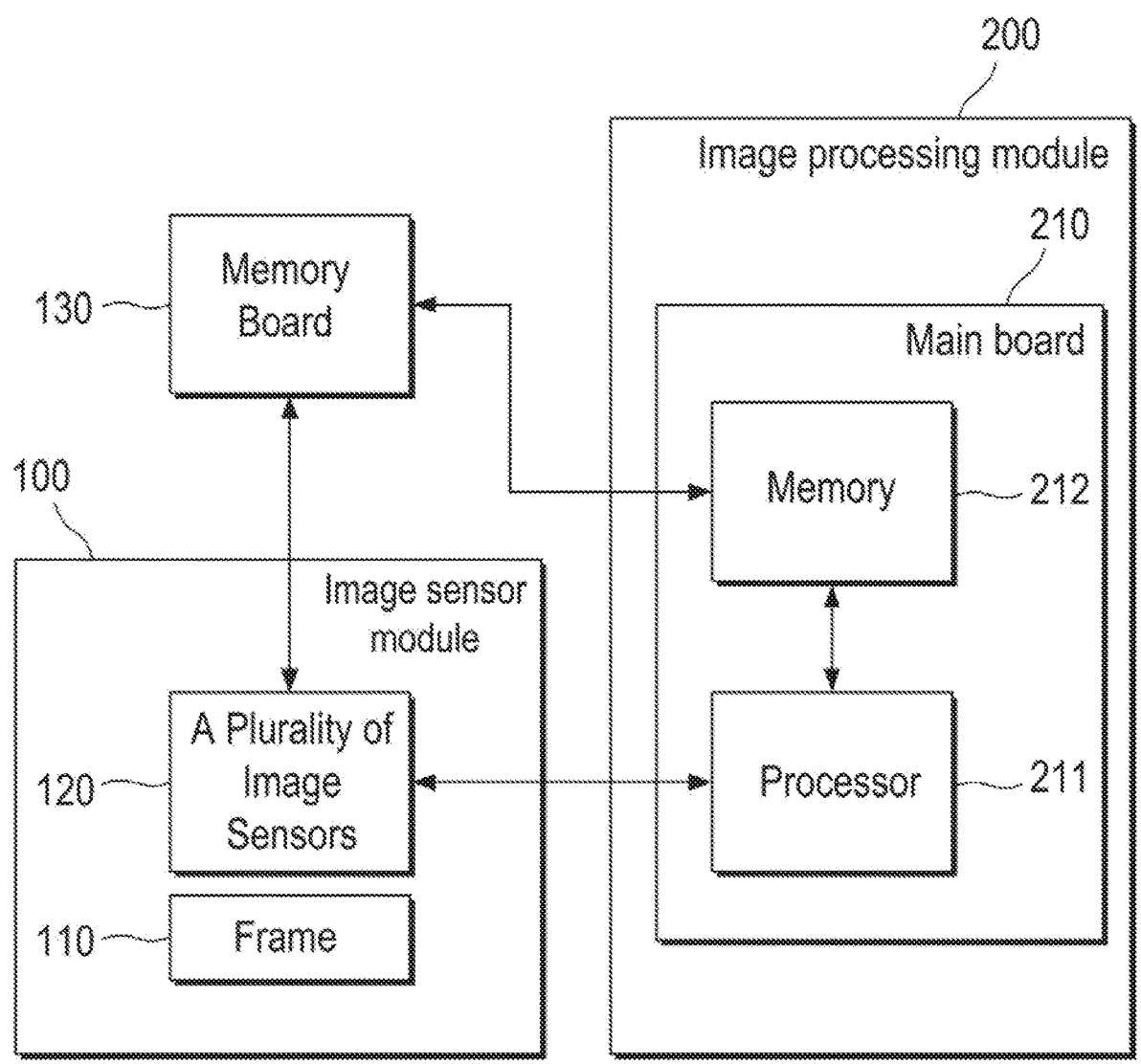
FIG. 7 is a block diagram of an image sensor module, a memory, and an image processing module included in an imaging device, according to another embodiment of the present invention.

FIG. 7 is a block diagram of an image sensor module, a memory, and an image processing module included in an imaging device according to another embodiment.

Referring to FIG. 7, an imaging device 10 includes an image sensor module 100, and an image processing module 200, similar to FIG. 1. The image sensor module 100 includes a plurality image sensors 120 and a frame 110, and the image processing module 200 includes a main board 210 on which a processor 211 and a memory 212 are mounted. Unlike the imaging device 10 of FIG. 1, however, the imaging device 10 of FIG. 7 includes a memory board 130 configured to be separately replaceable from the image sensor module 100 and the image processing module 200. The memory board 130 may include a mount that may be mounted on the image sensor module 100 or the image processing module 200, and may include a transmitter (not shown), corresponding to the transmitter 140 of FIG. 1, that transmits calibration information to the main board 210. The transmitter may be formed in the form of a processor connected through a connection cable, and may transmit calibration information to the main board 210 through the connection cable. According to an embodiment, the transmitter may be included in the image sensor module 100 separately from the memory board 130 as shown in FIG. 1.

Figure 8:
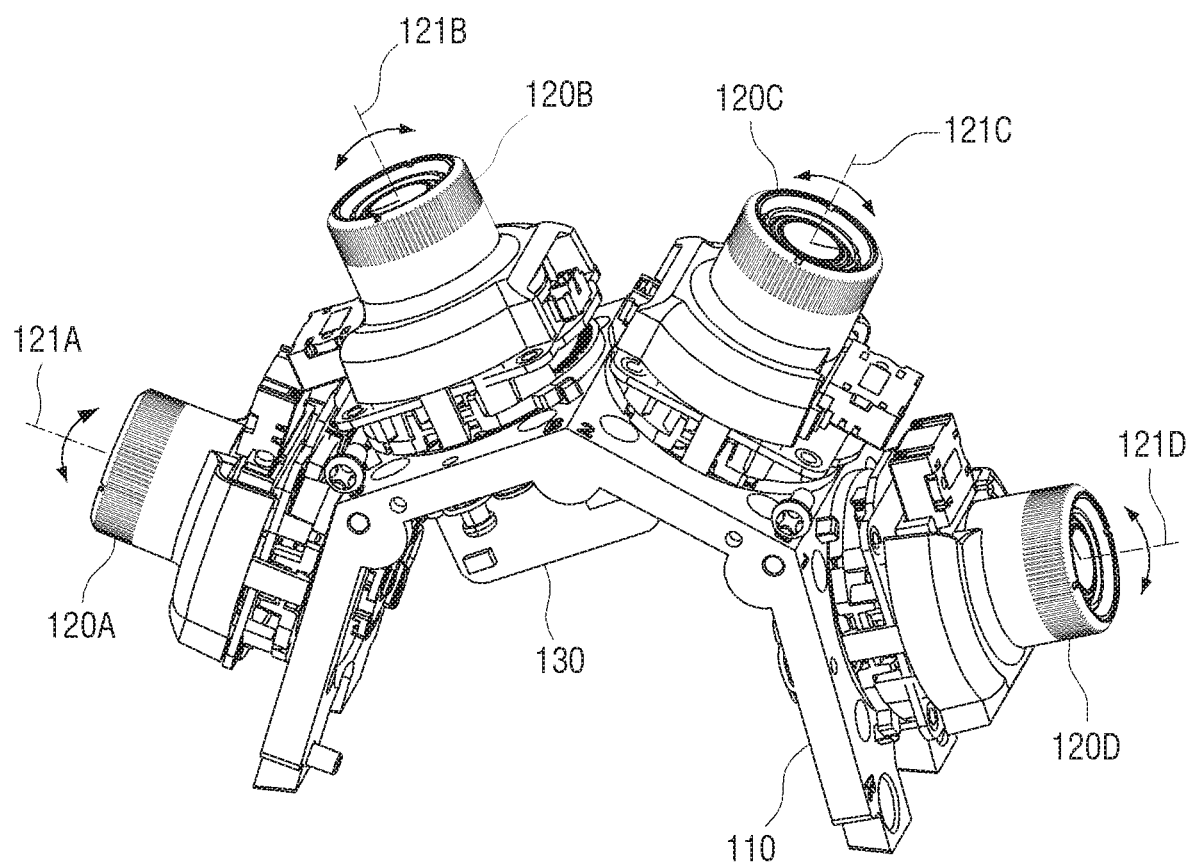
FIG. 8 is a perspective view of an image sensor module of an imaging device, according to another embodiment.

FIG. 8 is a perspective view of an image sensor module according to another embodiment.

Referring to FIG. 8, the image sensor module 100 includes a plurality image sensors 120A, 120B, 120C and 120D, similar to the image sensor module 100 of FIGS. 1 and 2. FIG. 8 further shows that the memory board 130 is mounted on the frame 10.

As shown in FIG. 8, the image sensors 120A, 120B, 120C, and 120D may be configured to be rotatable at predetermined angles on the frame 110 according to an embodiment while maintaining optical axes 121A, 121B, 121C and 121D, respectively. The predetermined angles may be the same or different from one another.

Here, the frame 110 may further include a guide (not shown) for maintaining the image sensors 120A, 120B, 120C and 120D rotated at a specific angle. For example, the frame 110 may further include a guide (not shown) capable of maintaining the rotation of the image sensors only at 0 degrees and 90 degrees with respect to a predetermined reference angle (for example, 0 degrees). In addition, the frame 110 may further include an actuator (not shown) capable of rotating the image sensors 120.

The user may manipulate the image sensors 120A, 120B, 120C and 120D such that rotation angles thereof are all 0 degrees or all 90 degrees. For example, the user applies an external force to handles of the image sensors 120A, 120B, 120C and 120D to switch a state thereof from 0 degree rotation to 90 degree rotation or 90 degree rotation to 0 degree rotation.

FIGS. 9A, 9B, 10A and 10B are views for describing a process of generating one image from a plurality images obtained by a plurality image sensors, according to embodiments.

Figure 9A:
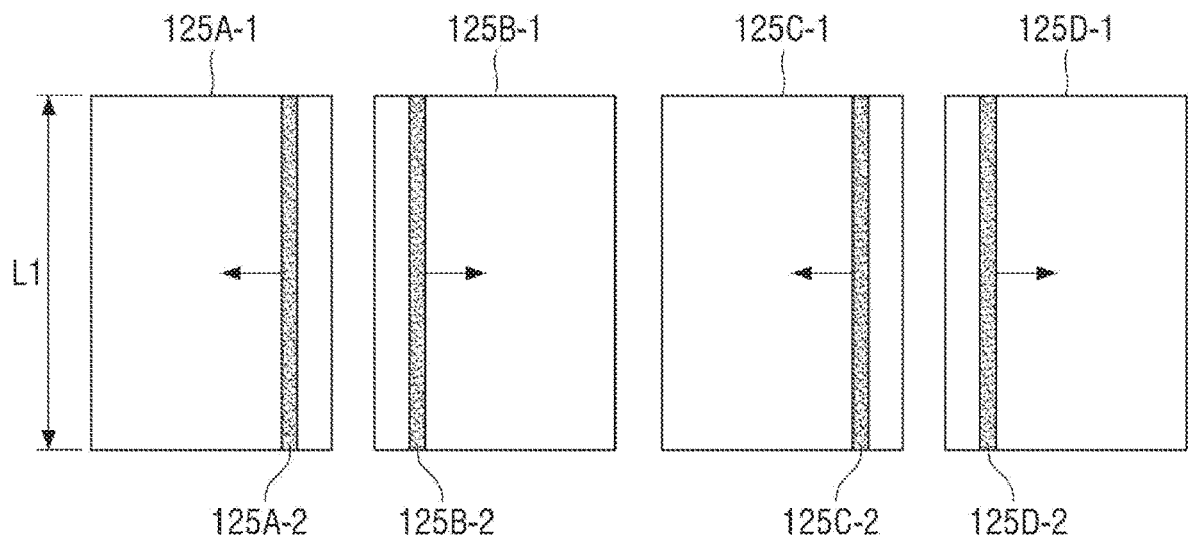
Figure 9B:
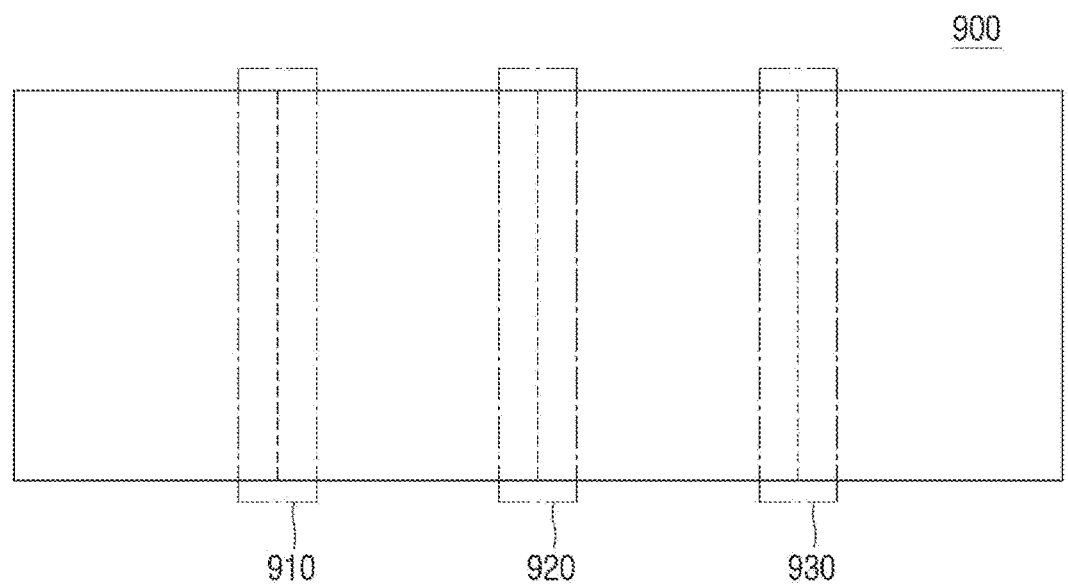

FIG. 9A illustrates a state in which the image sensors 120A, 120B, 120C and 120D are rotated in a first imaging mode which obtains respective images at first rotation angles, and FIG. 9B illustrates a connected image obtained by the image sensors 120A, 120B, 120C and 120D in the first imaging mode. FIG. 10A illustrates a state in which the image sensors 120A, 120B, 120C and 120D are rotated in a second imaging mode which obtains respective images at second rotation angles, and FIG. 10B illustrates a connected image obtained by the image sensors 120A, 120B, 120C and 120D in the second imaging mode.

In the first imaging mode, respective imaging regions 125A-1, 125B-1, 125C-1 and 125D-1 of the image sensors 120A, 120B, 120C and 120D may be arranged as shown in FIG. 9.

In the first imaging mode, the image sensors 120A, 120B, 120C and 120D may be rotated and disposed in a state in which edges of a first length L1 are close to each other between imaging regions of adjacent two image sensors. Here, exposure regions on the imaging regions of the adjacent image sensors may move away from or close to each other.

For example, in the case of imaging regions 125A-1 and 125B-1 of two adjacent image sensors 120A and 120B, exposure regions 125A-2 and 125B-2 may move in a direction away from each other.

In addition, in the case of imaging regions 125B-1 and 125C-1 of two image sensors 120B and 120C, exposure regions 125B-2 and 125C-2 may move in a direction closer to each other.

As described above, the image sensors 120A, 120B, 120C and 120D according to the present embodiment may synchronize exposure time zones of edge portions 910, 920 and 930 in FIG. 9B of the imaging regions 125A-1, 125B-1, 125C-1 and 125D-1 with exposure time zones of imaging regions of adjacent image sensors among the image sensors 120A, 120B, 120C and 120D, thereby obtaining a naturally connected image.

In the first imaging mode for imaging at the first rotation angles, the imaging device may generates a connected image 900 (FIG. 9B) having a longer longitudinal length and a shorter width compared with a connected image 1000 (FIG. 10B) generated in the second imaging mode for imaging at the second rotation angle orthogonal to the first rotation angle. Therefore, the first imaging mode may be a mode used when an angle of view extended in a longitudinal direction is required.

In the second imaging mode, the imaging regions 125A-1, 125B-1, 125C-1 and 125D-1 of the image sensors 120A, 120B, 120C and 120D according to the present embodiment may be arranged as shown in FIG. 10A.

In the second imaging mode, the image sensors 120A, 120B, 120C and 120D may be rotated and disposed in a state in which edges of a second length L2 are close to each other between imaging regions of adjacent two image sensors. Here, the exposure regions 125A-2, 125B-2, 125C-2 and 125D-2 on the imaging regions 125A-1, 125B-1, 125C-1 and 125D-1 of the image sensors 120A, 120B, 120C and 120D may move in the same direction.

In the second imaging mode, the imaging device may generate a connected image 1000 (FIG. 10B) having a longer width and a shorter longitudinal length compared with the connected image 900 (FIG. 9B) generated in the first imaging mode. Therefore, the second imaging mode may be a mode used when an angle of view extended in a width direction is required.

The processor 211 of the image processing module 200 according to the present embodiment may use a look up table from partial images obtained by the image sensors 120A, 120B, 120C and 120D described above to generate a connected image such as 900 of FIG. 9B and 1000 of FIG. 10B.

Here, at least one of the transmitter 140 and the processor 211 may include any kind of device capable of processing data. For example, the processor may be a data processing device embedded in hardware having a physically structured circuit for performing a function represented by codes or instructions included in a program.

An example of such a data processing device embedded in hardware may encompass a microprocessor, a central processing unit (CPU), a processor core, a multiprocessor, and an application-specific integrated circuit (ASIC), a field programmable gate array (FPGA), or the like, not being limited thereto. The processor 211 may be configured as a single processor or a plurality of processors.

According to an embodiment, the transmitter 140 and the processor 211 may be embodied as various numbers of hardware, software and/or firmware structures that execute respective functions described above. For example, they may use a direct circuit structure, such as a memory, a processor, a logic circuit, a look up table, etc. that may execute the respective functions through controls of one or more microprocessors or other control apparatuses. Also, they may be specifically embodied by a module, a program, or a part of code, which contains one or more executable instructions for performing specified logic functions, and executed by one or more microprocessors or other control apparatuses. Further, they may include or may be implemented by a processor such as a CPU that performs the respective functions, a microprocessor, or the like.

The memory 212 of the image processing module 200 may perform a function of temporarily or permanently storing data, instructions, programs, program codes, or a combination thereof processed by the processor 211. Such a memory may include a magnetic storage medium or a flash storage medium, not being limited thereto.

The image sensor module 100 according to the present embodiment may configure the imaging device 10 together with the image processing module 200 as shown in FIG. 7. By storing a look up table for calibration in a memory mounted on the memory board 30 of the image sensor module 100, it may be possible to efficiently cope with replacement of the main board 210 due to the failure of the main board 210 of the image processing module 200.

FIG. 11 is a flowchart of a method for transmitting calibration information stored in a memory mounted on an image sensor module to a main board of an image processing module, according to an embodiment. The detailed description of each step of FIG. 11 corresponds to the detailed description of the image sensor module 100 and the image processing module 200 shown in reference to FIGS. 1 to 10B, and thus, redundant descriptions thereof will be omitted.

The method for transmitting calibration information stored in a memory mounted on an image sensor module to a main board of an image processing module is performed in Steps S11 to S13.

In Step S11, when a failure is detected at an imaging device including the image sensor module and the image processing module, a connection cable connecting the main board of the image processing module and a memory board of the image sensor module on which a memory is mounted is released. Here, the detected failure may be a failure at the main board of the image processing module. Then, in Step S12, the connection cable or a new connection cable is connected between the memory board and another main board which may be a new main board. In Step S13, when power is applied while the connection cable is connected between the memory board and the other main board, calibration information stored in the memory of the memory board is transmitted to the other main board through the connection cable.

The memory may store calibration information on overlapping regions of a plurality images obtained by a plurality image sensors including distance information, as a look up table (LUT).

The memory is mounted on the memory board, and the memory board may further include a transmitter to transmit the calibration information stored in the memory to the main board of the image processing module and a mount mounted on the image sensor module. The memory may be a flash memory.

The above embodiments may be implemented in the form of program instructions that may be executed by various computer means, and be recorded on a computer readable medium. The computer readable medium may include program instructions, data files, data structures, or the like, alone or in combination. The program instructions recorded on the medium may be those specially designed and constructed for the purposes, or they may be of the kind well-known and available to those having skill in the computer software arts. An example of a computer readable recording medium includes magnetic media such as hard disks, floppy disks and magnetic tape, optical media such as CD-ROMs, DVDs, magneto-optical media, such as floptical disks, and hardware devices specifically configured to store and execute program instructions such as ROMs, RAMs, flash memories, or the like. The computer readable recording medium may also be distributed over network coupled computer systems so that the computer readable code is stored and executed in a distributed fashion. Functional programs, codes, and code segments for implementing the present invention may be easily inferred by programmers in the art to which the present invention belongs. Examples of program instructions include machine codes, such as produced by a compiler, as well as high-level language codes that may be executed by a computer using an interpreter or the like. The hardware device described above may be configured to operate as one or more software modules to perform the respective operations, and vice versa.

Those skilled in the art will appreciate that the inventive concept may be implemented in other specific forms without changing the technical spirit or essential features. Therefore, it should be understood that the embodiments described above are exemplary in all respects and not restrictive. It should be construed that the scope of the inventive concept is indicated by the following claims rather than the above description, and all changes or modifications derived from the meaning and scope of the claims and their equivalents are included in the scope of the inventive concept.

What is claimed is:

1. An image sensor module, comprising:
a plurality of image sensors that are rotatable at a predetermined angle while maintaining an optical axis;
a frame in which the plurality of image sensors are mounted to have different imaging angles; and
at least one memory configured to store calibration information reflecting distance information generated from a plurality of images obtained by the plurality of image sensors, respectively;
wherein the calibration information comprises information about a first overlapping region of the plurality of images when each of the plurality of image sensors is at a first angle and information about a second overlapping region of the plurality of images when each of the plurality of image sensors is at a second angle orthogonal to the first angle, and
wherein the image sensor module further comprises a transmitter configured to, in response to a main board of an image processing module being replaced with another main board, transmit the information about the first overlapping region and the second overlapping region from the image sensor module to the other main board of the image processing module.

2. The image sensor module of claim 1, wherein the calibration information comprises information about an overlapping region of the plurality of images obtained by the image sensors and the distance information.

3. The image sensor module of claim 2, wherein the calibration information further comprises information about characteristics of each of the plurality of image sensors.

4. The image sensor module of claim 2, wherein the calibration information is used for generating a three-dimensional image by combining the plurality of images.

5. The image sensor module of claim 1, wherein the transmitter is further configured to transmit the calibration information stored in the at least one memory to the main board of the image processing module in response to the at least one memory being connected with the main board of the image processing module.

6. The image sensor module of claim 1, wherein the transmitter is further configured to transmit the calibration information stored in the at least one memory to the main board of the image processing module in response to power being applied to the image sensor module.

7. The image sensor module of claim 1, wherein the transmitter is further configured to transmit the calibration information stored in the at least one memory to the main board of an image processing module which generates an image by combining the plurality of images based on the calibration information, in response to the main board of the image processing module being replaced by the other main board.

8. An imaging device comprising:
an image sensor module of claim 1; and
the image processing module comprising another memory and a processor configured to generate an image by combining the plurality of images obtained by the image sensors based on the calibration information.

9. The imaging device of claim 8, wherein the calibration information further comprises:
information about an overlapping region of the plurality of images obtained by the image sensors and the distance information about the plurality of images; and
information about characteristics of each of the image sensors.

10. The imaging device of claim 9, wherein the generated image is a three-dimensional image.

11. The imaging device of claim 8, wherein the image sensor module is configured to transmit the calibration information stored in the least one memory of the image sensor module to the other memory of the image processing module, in response to the processor of the image processing module comparing calibration data stored in the least one memory of the image sensor module with calibration data stored in the other memory of the image processing module, and detecting a difference therebetween.

12. A memory board mounted on an image sensor module comprising one or more memories and a plurality of image sensors, the memory board comprising:
  a memory to store calibration information reflecting distance information about a plurality of images respectively obtained by the image sensors having different imaging angles;
  wherein the calibration information comprises information about a first overlapping region of the plurality of images when each of the plurality of image sensors is at a first angle and information about a second overlapping region of the plurality of images when each of the plurality of image sensors is at a second angle orthogonal to the first angle, and
  wherein the image sensor module further comprises a transmitter configured to, in response to a main board of an image processing module being replaced with another main board, transmit the information about the first overlapping region and the second overlapping region from the image sensor module to the other main board of the image processing module.

13. A method for transmitting calibration information stored in a memory of an image sensor module, comprising a plurality of image sensors, to a main board of an image processing module, the method comprising:
  releasing a connection cable connecting the main board with a memory board including the memory;
  connecting the connection cable or another connection cable between the memory board and another main board replacing the main board of the image processing module; and
  in response to the main board of the image processing module being replaced with the other main board, transmitting, from the image sensor module to the other main board through the connection cable, the calibration information that comprises information about a first overlapping region of a plurality of images when each of the plurality of image sensors is at a first angle and information about a second overlapping region of the plurality of images when each of the plurality of image sensors is at a second angle orthogonal to the first angle.

14. The method of claim 13, wherein the memory stores the calibration information comprising distance information about the plurality of images.

15. The method of claim 14, wherein the calibration information further comprises information about characteristics of each of the image sensors, and
  wherein the plurality of images are combined to generate a three-dimensional image by the image processing module.

* * * * *